(12) United States Patent
Kawai et al.

(10) Patent No.: US 11,549,620 B2
(45) Date of Patent: Jan. 10, 2023

(54) SCREW JOINT FOR OIL WELL PIPE

(71) Applicant: JFE STEEL CORPORATION, Tokyo (JP)

(72) Inventors: Takamasa Kawai, Tokyo (JP); Masaki Yoshikawa, Tokyo (JP); Jun Takano, Tokyo (JP); Takuya Nagahama, Tokyo (JP); Haruhiko Seki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 83 days.

(21) Appl. No.: 16/977,835

(22) PCT Filed: Feb. 14, 2019

(86) PCT No.: PCT/JP2019/005177
§ 371 (c)(1),
(2) Date: Sep. 3, 2020

(87) PCT Pub. No.: WO2019/171899
PCT Pub. Date: Sep. 12, 2019

(65) Prior Publication Data
US 2021/0025523 A1 Jan. 28, 2021

(30) Foreign Application Priority Data
Mar. 5, 2018 (JP) .............................. JP2018-038495

(51) Int. Cl.
*F16L 15/00* (2006.01)
*E21B 17/042* (2006.01)
(Continued)

(52) U.S. Cl.
CPC .......... *F16L 15/001* (2013.01); *E21B 17/042* (2013.01); *F16L 15/04* (2013.01); *F16L 15/06* (2013.01)

(58) Field of Classification Search
CPC ........ F16L 15/001; F16L 15/04; E21B 17/042
See application file for complete search history.

(56) References Cited

U.S. PATENT DOCUMENTS

| 5,687,999 A | 11/1997 | Lancry et al. |
| 8,246,086 B2 * | 8/2012 | Watts .................... E21B 17/042 |
| | | 285/334 |

(Continued)

FOREIGN PATENT DOCUMENTS

| CN | 103046876 A | 4/2013 |
| CN | 106837196 A | 6/2017 |

(Continued)

OTHER PUBLICATIONS

May 14, 2019 International Search Report issued in International Patent Application No. PCT/JP2019/005177.

(Continued)

*Primary Examiner* — David Bochna
(74) *Attorney, Agent, or Firm* — Oliff PLC

(57) ABSTRACT

A screw joint in which an efficient screw length of a joint portion is achieved. This screw joint is for an oil well pipe of an integral type and includes: (i) a pin that is provided with a male screw portion which is a male taper screw, at one end of a steel pipe; and (ii) a box that is provided with a female screw portion which is a female taper screw fitted to the male screw portion, at one end of the steel pipe, in which a structure, in which the pin and the box are in metal contact with each other to seal a fluid, is provided at least at one place of a seal portion on an outer peripheral surface side of a pipe end side of the pin and a seal portion on an inner peripheral surface side of a pipe end side of the box.

1 Claim, 2 Drawing Sheets

(51) Int. Cl.
*F16L 15/04* (2006.01)
*F16L 15/06* (2006.01)

(56) References Cited

U.S. PATENT DOCUMENTS

| | | |
|---|---|---|
| 2006/0125234 A1 | 6/2006 | Ernst et al. |
| 2014/0333065 A1 | 11/2014 | Pacheco |
| 2016/0161031 A1 | 6/2016 | Martin et al. |

FOREIGN PATENT DOCUMENTS

| | | |
|---|---|---|
| EP | 2682658 A1 | 1/2014 |
| EP | 3064818 A1 | 9/2016 |
| EP | 3366968 A1 | 8/2018 |
| FM | 102678070 A | 9/2012 |
| GB | 2234308 A | 1/1991 |
| JP | H10-318453 A | 12/1998 |
| JP | 2001-289371 A | 10/2001 |
| JP | 5232475 B2 | 7/2013 |
| JP | 2015-110994 A | 6/2015 |
| JP | 2016-533462 A | 10/2016 |
| WO | 2017/069030 A1 | 4/2017 |

OTHER PUBLICATIONS

Jul. 22, 2021 Office Action issued in Australian Patent Application No. 2019230247.
Jun. 30, 2021 Office Action issued in Chinese Patent Application No. 201980017424.X.
Apr. 20, 2021 Office Action issued in Australian Patent Application No. 2019230247.
Feb. 26, 2021 extended European Search Report issued in European Patent Application No. 19764512.0.
May 19, 2020 Office Action issued in Japanese Patent Application No. 2019-530840.
Sep. 8, 2020 Office Action issued in Japanese Patent Application No. 2019-530840.
Sep. 17, 2021 Office Action issued in Canadian Patent Application No. 3,088,237.

\* cited by examiner

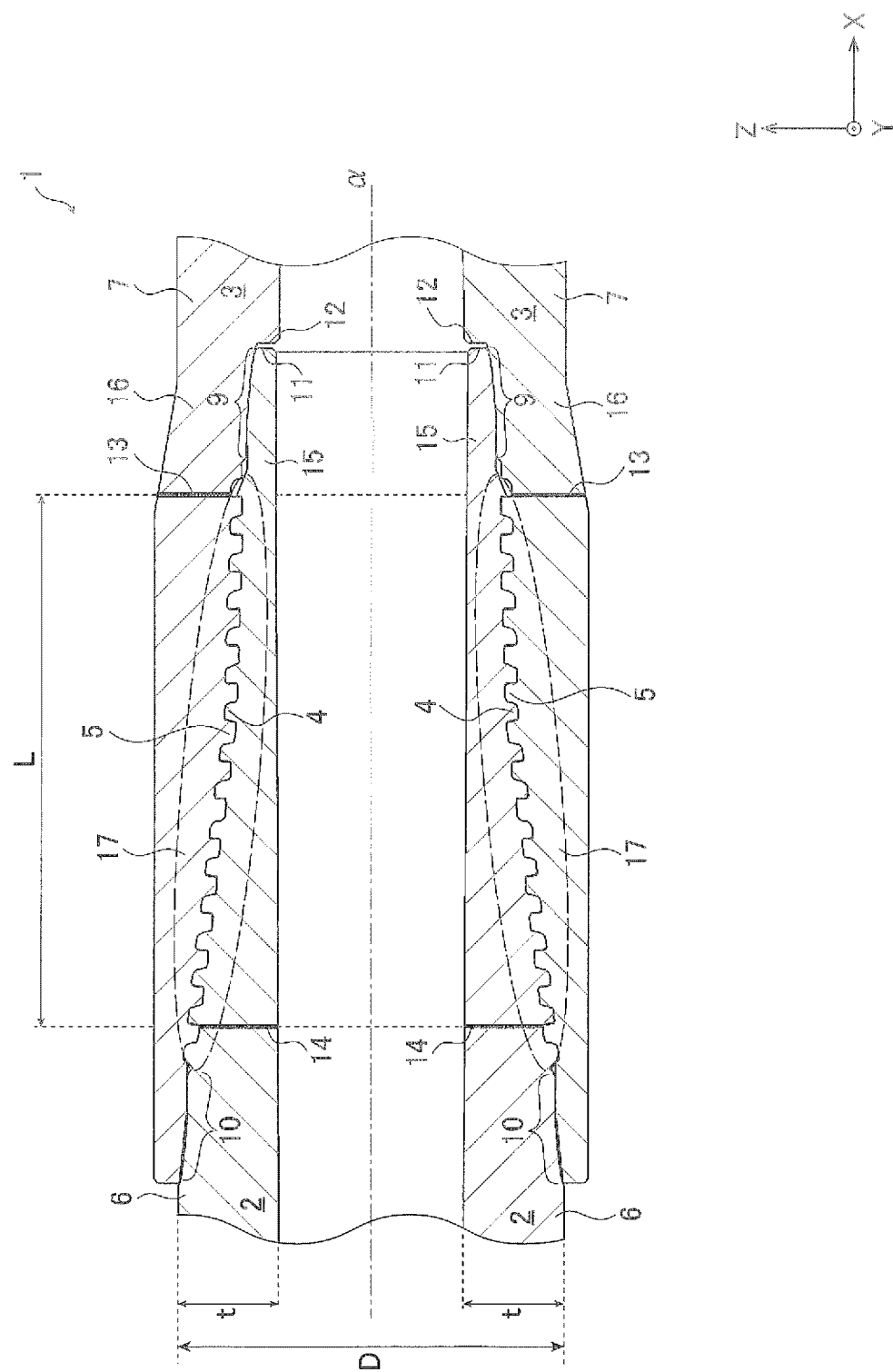
[FIG. 1]

[FIG. 2]
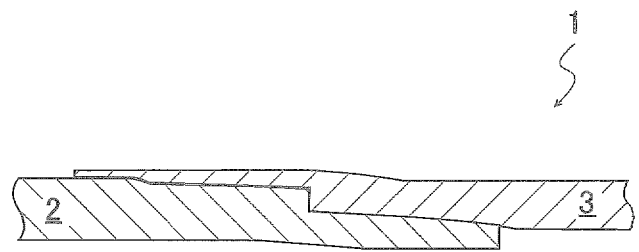

SCREW JOINT FOR OIL WELL PIPE

TECHNICAL FIELD

The disclosure relates to screw joints for oil well pipes that connect oil well pipes including tubing and casing used for explorations or productions of oil wells or gas wells, and more particularly to screw joints for oil well pipes in which processing time and construction time are reduced.

BACKGROUND

Screw joints are widely used for connecting steel pipes used in oil-producing industrial facilities such as oil well pipes. In the related art, standard screw joints for a pipe defined in American Petroleum Institute (API) standard are typically used for connections of the steel pipes used for explorations or productions of oil or gas.

In recent years, since wells of crude oil or natural gas have been used in deep wells and horizontal wells, directional wells, or the like have been increased from vertical wells, excavation and production environments have been more severe. In addition, since development of wells in poor environments such as oceans and polar regions have been increased, required performance of screw joints for pipes such as compression resistance performance, bending resistance performance, or external pressure sealing performance have diversified. Because of such a required performance, use of high-performance special screw joints for pipes called premium joints have increased.

In addition, in order to reduce the volume of excavation amount when wells are developed, it is necessary to make the wells slimmer. Therefore, among the premium joints, there is also growing demands for screw joints for pipes of integral types for directly connecting tubes (also referred to as pipes) without using coupling members.

The premium joint usually has a taper screw and a metal touch seal portions on a pipe end side of each pipe. These portions are respective elements constituting a pin that is a male screw portion provided on one end side of the pipe and a box that is a female screw portion screwed or fitted to the male screw portion provided on one end side of the pipe. These elements are designed so that a male taper screw and a female taper screw, and a male metal touch seal portion and a female metal touch seal portion face each other when tightening a joint (screw joint for a pipe, the same is applied to the following description). Moreover, the taper screw is necessary to tightly fix the joint. The metal touch seal portion secures a sealing property using metal contact between the box and the pin in a region of the metal touch seal portion.

In the screw joint for a pipe (hereinafter, also referred to as an integral joint) of the integral type, the metal touch seal portion is provided at one or two or more places in an axial direction (pipe axis direction, the same is applied to the following description). The metal touch seal portion is provided at least at one place of an outer peripheral surface of a non-screw portion (hereinafter, referred to as a nose) connected to a screw end on a pin distal end side of the taper screw of the pin and an inner peripheral surface of a non-screw portion (hereinafter, referred to as a nose hole) connected to a screw end on a box rear end side of the taper screw of the box.

As a prior technique of the related art of the integral joint, a screw joint 1 (pipe screw joint) for a pipe described in PTL 1 is illustrated in FIG. 2. An object of the invention described in PTL 1 is to produce a screw joint for a pipe, which maintains an appropriate rigidity and is provided with an improved seal, improve structural resistance (characteristic) of a joint against a high load, in particular, a compressive load, and cause the characteristics not to affect a sealing function. In the invention described in PTL 1, a reinforcing section protruding from the metal touch seal portion on a non-screw surface on the distal end side of the box 3 to a most distal end of the box is provided, a length of the reinforcing section or further a wall thickness (thickness) thereof is defined, and an entire length of the reinforcing section of the box is not in contact with the corresponding pipe (raw pipe portion) on the rear end side of a pin 2.

CITATION LIST

Patent Literature

[PTL 1] Japanese Patent No. 5232475

SUMMARY

Technical Problem

However, in the technique described in PTL 1, there is not mentioned about optimization of the screw length of the joint. There was room for improvement for the optimization of the screw length so as to achieve both productivity and shear fracture strength of the joint.

Normally, in the oil well pipe, a plurality of pipes having joint portions (generally referred to as the male screw portion and the female screw portion) are connected in series with the joint portions and are inserted in the well. In this state, a relatively large tensile load acts on the joint portion as in the pipe closer to the ground surface. Therefore, it is required for the screw joint for an oil well pipe to have strength that can avoid shear fracture such as fatigue fracture and tensile fracture as one of important joint performances. As a method for securing the strength of the joint portion, it is required to provide the joint portion with a long screw length to a certain extent. In general, in order to have the strength at which the joint portion can avoid the shear fracture, it is necessary for the shear fracture strength of the screw portion to exceed the tensile fracture strength of the screw portion, and it is necessary to design shear stress of the screw portion to be $1/\sqrt{3}$ times or less the tensile stress of the joint portion. Moreover, the screw length of the joint portion refers to an entire length of a portion where the male screw portion and the female screw portion in the joint portion are in a fitted state.

However, in order to secure the shear fracture strength, making the screw length of the joint portion extremely long poses a problem that a processing time increases in proportion to the screw length when threading or rolling to the steel pipe (raw pipe). In addition, when the screw is tightened, there is also a problem that the construction time extension. This causes poor productivity and increase in manufacturing cost.

In view of the above problems, an object of the disclosure is to provide a screw joint for an oil well pipe in which optimization of a screw length of a joint portion is achieved, and a processing time and a construction time are reduced.

Solution to Problem

The present inventors diligently studied in order to solve the above problems.

As described above, since in the oil well pipe, the plurality of pipes are connected in series with the joint portions and are inserted in the well, a relatively larger tensile load acts on the joint portion as in the pipe closer to the ground. In the joint portion, breakage of the pin, breakage of the box, or the like may occur. Therefore, it is required that the joint portion has strength enough to avoid the shear fracture as one of important joint performances. In response to the requirement, in order to secure the strength, it is usually dealt with by designing the screw length of the joint portion to be longer. Therefore, in general, it is designed with an excessive increase in the screw length in view of (in consideration of) safety. Therefore, the present inventors focused attention on a design such that the screw portions (referred to as the male and female taper screw portions) of the joint portion have a minimum necessary screw length not to cause the shear fracture and diligently studied on a screw joint for an oil well pipe in which both productivity and the shear fracture strength of the joint can be achieved.

As a result, it was found that the shear fracture of the screw portions can be prevented by defining a minimum necessary screw length $L_{min}$ (mm) such that a ratio of the shear stress acting on the male and female taper screws to the tensile stress acting on the critical cross-section of the joint when a tensile stress is applied to the joint is equal to or less than a predetermined value.

The disclosure has been made based on the above-described findings and the disclosure includes the following embodiments.

[1] A screw joint for an oil well pipe of an integral type, including: a pin that is provided with a male screw portion which is a male taper screw, at one end of a steel pipe; and a box that is provided with a female screw portion which is a female taper screw fitted to the male screw portion, at one end of the steel pipe, in which a structure, in which the pin and the box are in metal contact with each other to seal a fluid, is provided at least at one place of a seal portion on an outer peripheral surface side of a pipe end side of the pin and a seal portion on an inner peripheral surface side of a pipe end side of the box, in which a minimum value $L_{min}$ (mm) of a screw length L (mm) in screw rows of the male taper screw and the female taper screw is defined by expression (1), in which the screw length L (mm) in the screw rows satisfies expression (2).

$$L_{min} = ((t \times (D-t))/(\alpha_r \times D_r/\sqrt{3})) \times \text{joint efficiency} \quad (1)$$

$$L_{min} \times 1.0 \leq L \leq L_{min} \times 2.5 \quad (2)$$

Here, t: a pipe thickness (mm) of each of raw pipe portions which are unprocessed portions of the box and the pin, D: a pipe diameter (mm) of each of the raw pipe portions which are the unprocessed portions of the box and the pin, $\alpha_r$: a ratio of an effective screw length to the screw length L, a shorter effective screw length of the box or the pin being chosen for the effective screw length, $D_r$: an average screw diameter (mm) of screw valleys in the taper screw having a shorter effective screw length of the box or the pin, and joint efficiency: tensile strength of the joint portion/tensile strength of the raw pipe portion.

Moreover, in the disclosure, a minimum necessary screw length ($L_{min}$ (mm)) refers to a minimum value (lower limit value) of the screw length of the joint portion required for design, so that the screw portion has a strength that can avoid shear fracture.

In addition, the screw length (L (mm)) of the joint portion refers to a length (that is, a screw length in the screw rows of the male taper screw and the female taper screw) of a portion (screw fitting portion) where the male screw portion and the female screw portion of the joint portion are meshed with each other when the joint portion is screwed and tightened.

In addition, the effective screw length is a sum of lengths in an axial direction with respect to portions obtained by totaling bottom widths of screw threads of either the male screw portion or the female screw portion in the screw fitting portion, and is calculated for each of the male screw portion and the female screw portion.

In addition, the ratio ($\alpha_r$) of the effective screw length is a ratio of the effective screw length to the screw length L and a shorter effective screw length of the box or the pin is chosen for the effective screw length.

Advantageous Effects

According to the disclosure, it is possible to obtain a screw joint for an oil well pipe in which optimization of the screw length of the joint portion is achieved, and a processing time and a construction time are reduced.

BRIEF DESCRIPTION OF DRAWINGS

FIG. 1 is a sectional view of a screw joint for an oil well pipe in a pipe axis direction for explaining an example of an embodiment of the disclosure and a sectional view illustrating a portion where a pin and a box are tightened.

FIG. 2 is a sectional view illustrating an example of a screw joint for an oil well pipe of the related art in a pipe axis direction.

DETAILED DESCRIPTION

Hereinafter, a screw joint 1 for an oil well pipe of the disclosure will be described with reference to FIG. 1. Moreover, the disclosure is not limited to the following embodiment. FIG. 1 is a sectional view of the screw joint 1 for the oil well pipe in a pipe axis direction for explaining an embodiment of the disclosure and a sectional view illustrating a portion where a pin 2 and a box 3 are tightened (fitted) and a periphery thereof. Moreover, FIG. 1 is also an explanatory view of expression (1) and expression (2) described below.

The screw joint 1 for the oil well pipe of the disclosure includes the pin 2 that is provided with a male screw portion 4 which is a male taper screw at one end of a steel pipe and the box 3 that is provided with a female screw portion 5 which is a female taper screw fitted to the male screw portion 4 at one end of the steel pipe. In addition, the screw joint 1 for the oil well pipe of an integral type includes a structure, in which the pin 2 and the box 3 are in metal contact with each other to seal a fluid, provided at least at one place of a seal portion 9 on an outer peripheral surface side of a pipe end side of the pin 2 and a seal portion 10 on an inner peripheral surface side of a pipe end side of the box 3. A minimum value $L_{min}$ (mm) of a screw length L (mm) in screw rows of male and female taper screws is defined by the expression (1) described below and the screw length L (mm) in the screw rows satisfies the expression (2) described below.

First, a configuration of the screw joint 1 for the oil well pipe of the disclosure will be described.

As illustrated in FIG. 1, the screw joint 1 for the oil well pipe of the disclosure connects the steel pipes with the pin 2 and the box 3. The screw joint 1 for the oil well pipe is a screw joint (premium joint) in which the pin 2 and the box 3 are coupled. In addition, the screw joint 1 for the oil well pipe is a screw joint of an integral type in which the steel pipes are directly connected by the pin 2 and the box 3.

The pin 2 is provided with the male screw portion 4 which is the male taper screw at one end of the steel pipe. The box 3 is provided with the female screw portion 5 which is the female taper screw fitted or screwed to the male screw portion 4 at one end of the steel pipe. Moreover, in the disclosure, as illustrated in FIG. 1, a region including the male screw portion 4 and a periphery of a nose 15 on a male side which is described below is referred to as the pin 2. A region including the female screw portion 5 and a periphery of a nose hole 16 on a female side which is described later is referred to as the box 3.

The screw joint 1 for the oil well pipe has a structure in which the pin 2 and the box 3 are in metal contact with each other to seal a fluid. In a case of the screw joint 1 for the oil well pipe illustrated in FIG. 1, the seal structure is provided at two places of the seal portion 9 on an outer peripheral surface side of a pipe end side (positive direction side of an X-axis parallel to a screw joint axis a in FIG. 1) of the male screw portion 4, and the seal portion 10 on an inner peripheral surface side of an pipe end side (negative direction side of the X-axis in FIG. 1) of the female screw portion 5.

For example, when the joint is tightened, metal touch seal portions of the nose 15 (non-screw portion connected to a screw end of a distal end side of the pin 2) and the nose hole 16 (non-screw portion connected to a screw end on a far end side of the box 3) are in contact with each other, so that the seal portion 9 on the outer peripheral surface side forms a seal surface for preventing the fluid inside the pipe from entering the region of the taper screw.

The seal portion 10 on the inner peripheral surface side is provided on an outer peripheral surface (for the sake of convenience, referred to as a non-screw surface on the far end side of the pin) of the non-screw portion connected to the screw end on a far end side of the pin 2, and an inner peripheral surface (for the sake of convenience, referred to as a non-screw surface on the distal end side of the box) of the non-screw portion connected to the screw end of the distal end side of the box 3. When the screw joint is tightened, the seal portions of the non-screw surface on the far end side of the pin and the non-screw surface on the distal end side of the box are in contact with each other, so that the seal portion 10 on the inner peripheral surface side forms a seal surface for preventing the fluid outside the pipe from entering the region of the taper screw.

In addition, the screw joint 1 for the oil well pipe may have a shoulder portion 11 at a distal end of the pin 2. In this case, as illustrated in FIG. 1, a shoulder portion 12 abutting against the shoulder portion 11 on a pin 2 side is also provided in the box 3.

Moreover, the raw pipe portions refer to a region (unprocessed portion 7 of the box) of a pipe body other than the female screw portion 5 in the box 3, and a region (unprocessed portion 6 of the pin) of the pipe body other than the male screw portion 4 in the pin 2, respectively. Both the unprocessed portion 6 of the pin 2 and the unprocessed portion 7 of the box 3 are cylindrical shape.

Next, a relationship between the screw length L (mm) and the minimum value $L_{min}$ (mm) of the screw length in a screw row 17 of the screw joint 1 for the oil well pipe of the disclosure will be described with reference to FIG. 1.

It is important that the screw joint 1 for the oil well pipe of the disclosure is designed so that the screw portions (referring to male and female taper screw portions) of the joint portion have a joint strength that is not subjected to shear fracture and a minimum necessary screw length to satisfy the tensile strength. Therefore, in the disclosure, the allowable range of the screw length is determined as follows from a viewpoint of strength and dimensional restrictions.

A lower limit value, that is, the minimum value $L_{min}$ (mm) of the screw length L (mm) in the screw rows 17 of the male and the female taper screws is defined by the following expression (1). Furthermore, the screw length L (mm) in the screw row 17 is necessary to satisfy the following expression (2).

$$L_{min}=((t \times (D-t))/(\alpha_t \times D_t/\sqrt{3})) \times \text{joint efficiency} \quad (1)$$

$$L_{min} \times 1.0 \leq L \leq L_{min} \times 2.5 \quad (2)$$

Here, t: a pipe thickness (mm) of the raw pipes of the unprocessed portions of the box and the pin, D: a pipe diameter (mm) of the raw pipes of the unprocessed portions of the box and the pin, $\alpha_t$: a ratio of an effective screw length to the screw length L, a shorter effective screw length of the box or the pin being chosen for the effective screw length, $D_t$: an average screw diameter (mm) of screw valleys in the taper screw having a shorter effective screw length of the box or the pin, and joint efficiency: tensile strength of the joint portion/tensile strength of the raw pipe portion.

$\alpha_t$ is determined by a design of a screw shape. In a case where a width of a screw bottom is different between the pin and the box, the effective length becomes shorter in the shape as a width of the screw bottom is narrower. In case of a design in which the width of a bottom portion of the screw thread is larger by comparing a width of a top portion and the width of the bottom portion, for example, in a trapezoidal screw, $\alpha_t$ tends to be larger. Conversely, in a design in which the width of the bottom portion is smaller by comparing the width of the top portion and the width of the bottom portion of the screw thread, for example, in a wedge screw, $\alpha_t$ tends to be smaller.

In a case where the screw length L (mm) does not satisfy ($L_{min} \times 1.0$ L) of the expression (2), the screw portion may be subjected to the shear fracture by a tensile load equal to or less than the tensile strength of the joint in the pipe axis direction. Preferably, it is $L_{min} \times 1.25 \leq L$. On the other hand, in a case where the screw length L (mm) does not satisfy ($L \leq L_{min} \times 2.5$) of the expression (2), it cannot be said that the screw length is designed to be sufficiently short and it cannot be said that the screw joint is excellent in workability and productivity which are the effects of the disclosure. Preferably, it is $L \leq L_{min} \times 2.0$.

Moreover, for example, in a case of the screw joint 1 for the oil well pipe illustrated in FIG. 1, the screw row 17 refers to a region of the taper screw which is provided in each of the pin 2 and the box 3.

In addition, as described below, the screw length L (mm) refers to a length from a position of a critical cross-section 14 of the pin 2 to a critical cross-section 13 of the box 3.

In addition, the minimum value $L_{min}$ (mm) of the screw length L refers to a minimum necessary length of the screw length L defined in the expression (1).

In addition, as illustrated in FIG. 1, the pipe thickness t (mm) of the raw pipe portion refers to a pipe thickness of the unprocessed portion 6 of the pin and the unprocessed portion 7 (raw pipe portion) of the box. The pipe diameter D (mm) of the raw pipe portion refers to a pipe diameter of each of the unprocessed portion 6 of the pin and the unprocessed portion (raw pipe portion) of the box.

$D_t$ (mm) refers to an average screw diameter of the screw valleys in the taper screw which is a shorter effective screw length of either the box or the pin.

Here, the expression (1) for obtaining the minimum necessary screw length (that is, the minimum value $L_{min}$ of the screw length) will be described.

The joint strength (tensile strength of the screw joint 1) is determined by a portion having a smaller cross-sectional area among respective critical cross-sections 13 of the box and critical cross-sections 14 of the pin 2 (see FIG. 1). Here, the critical cross-section refers to a cross-section orthogonal to the pipe axis where breakage tends to occur most in a tensile load state of the joint portion.

For example, in a case of the screw joint 1 for the oil well pipe illustrated in FIG. 1, as the critical cross-section 13 of the box 3, a cross-section located on a load flank surface of a first screw thread in the region of the screw row 17 on the female screw portion 5 side is adopted. In addition, as the critical cross-section 14 of the pin 2, a cross-section located on a load flank surface of a second screw thread in the region of the screw row 17 on the male screw portion 4 side is adopted. Moreover, the load flank surface refers to a flank surface on a side where a load is applied against a tensile force in the pipe axis direction. Therefore, in a case of the joint portion illustrated in FIG. 1, the cross-sectional area of the critical cross-section 14 of the pin 2 is smaller than the cross-sectional area of the critical cross-section 13 of the box 3, so that the joint strength is determined based on the critical cross-section 14 of the pin 2.

Normally, in a case where the strength (tensile strength of each raw pipe portion of the pin 2 and the box 3) of the raw pipe is 100%, in the integral joint, since the cross-sectional area of the critical cross-section is necessarily smaller than the cross-sectional area of the raw pipe, the joint strength of the integral joint becomes less than 100% of the strength of the raw pipe.

A maximum tensile strength (maximum tensile stress) of the joint portion can be calculated using the following expression (3) from the viewpoint of the joint efficiency calculated from the critical cross-section.

$$\text{Maximum tensile stress (MPa) of joint portion} = \text{tensile stress (MPa) of raw pipe} \times \text{joint efficiency} \quad (3)$$

In a case where the tensile stress of the raw pipe is taken as a reference, an allowable shear stress of the screw portion is necessary to satisfy the following expression (4).

$$\text{Shear stress ratio of screw portion} \leq ((1/\sqrt{3})/\text{joint efficiency}) \quad (4)$$

The shear stress ratio is set to be equal to or less than a value expressed by $((1/\sqrt{3})/\text{the joint efficiency})$, so that the shear fracture can be prevented. From the viewpoint of securing safety, it is preferable that a safety factor 0.8 is applied to the expression (4) (that is, the safety factor 0.8 is multiplied on a right side of the expression (4)), and the shear stress ratio is set to be equal to or less than (0.46/joint efficiency). Moreover, in the disclosure, since an upper limit of the screw length is set to $L_{min} \times 2.5$ by the expression (2), a lower limit of the shear stress ratio is equal to a case where the safety factor 0.4 is applied and is calculated as (0.23/joint efficiency).

A relationship between the shear stress of the screw portion and the maximum tensile stress of the joint portion which are obtained as described above is represented by the following expression (5).

$$(\text{Shear stress of screw portion/tensile stress of joint portion}) \leq 1/\sqrt{3} \quad (5)$$

In addition, a left side of the expression (5) can be converted as follows using the expression (3).

Left side=(shear stress of screw portion)/(tensile stress of raw pipe portion/joint efficiency)=
(tensile force/effective cross-sectional area of screw portion)/(tensile force/cross-sectional area of raw pipe)×(joint efficiency)=(cross-sectional area of raw pipe/effective cross-sectional area of screw portion)×(joint efficiency)=(cross-sectional area of raw pipe/(circular constant×effective screw length×average screw diameter))×(joint efficiency)=$((\pi \cdot t \cdot (D-t))/(\pi \cdot \alpha_t \times L \times D_t))$×joint efficiency Therefore, the expression (5) becomes $$((\pi \cdot t \cdot (D-t))/(\pi \cdot \alpha_t \times L \times D_t)) \times \text{joint efficiency}(1/\sqrt{3}) \quad (6)$$

A condition that satisfies an equal sign of the expression (6) is the minimum length $L_{min}$ of L, and the expression (1) is obtained by solving the expression for $L_{min}$.

Moreover, in the integral joint, as described above, there are some cases in which the regions of the male and female taper screws are divided into two in the pipe axis direction in each of the pin and the box. The disclosure can also be applied to the integral joint of such designs.

As described above, according to the disclosure, it is possible to design the screw joint for an oil well pipe to secure the minimum necessary screw length ($L_{min}$) so that the screw portion is not subjected to the shear fracture. Therefore, a processing time for performing threading process or a rolling process in the steel pipe (raw pipe) is decreased (reduced), and a construction time required for tightening the male and female taper screws is also decreased (reduced). As a result, an excellent design in which the productivity is improved and the manufacturing cost can be reduced is provided, and both the productivity and the shear fracture strength of the joint can be improved.

The screw length (L (mm)) having an appropriate allowable width while having a screw characteristic normally required can be calculated. Therefore, since the region in the thickness direction occupied by the screw portion in which the screw length (L (mm)) becomes smaller than a general screw length of the related art can be reduced, the thickness of the nose 15 can be secured and a degree of freedom of the design of the seal can be increased.

Examples

Hereinafter, the disclosure will be described based on examples. The disclosure is not limited to the following examples.

For a screw joint for an oil well pipe, which includes a pin obtained by machining an end portion of a steel pipe of an outer diameter 9⅝ inches×thickness 0.545 inches (outer diameter 244.48 mm×thickness 13.84 mm) of a steel type Q125 of API 5CT, and a box corresponding thereto, a pin was prepared by subjecting the end portion to diameter reduction processing at a ratio of 3 to 5%, and cutting the outer diameter side, and a box was prepared by subjecting the end portion to tube expansion at a ratio of 5 to 8%, and cutting the inner diameter side. The number of samples was 6 pairs. The schematic drawing of the screw joint is a semi flush screw joint shown in FIG. 1.

Using the obtained screw joints for an oil well pipe (test joint Nos. 1 to 6), (1) whether or not the shear fracture occurred, and (2) workability and construction property were respectively evaluated.

(1) Evaluation for Shear Fracture

The evaluation whether or not the screw portion of the joint portion was subjected to the shear fracture was performed by determining whether or not the screw portion was subjected to the shear fracture in a case where the tensile load was applied based on the joint efficiency calculated from the critical cross-section. Here, an angle of the load flank as a contact surface of the screw thread was set to −5 degrees and an angle of a stabbing flank was set to 15 degrees.

(2) Evaluation for Workability and Construction Property

In each test joint, a processing time (sec) required for manufacturing the pin and the box, and a tightening time (sec) of the pin and the box were respectively measured. The processing time was taken as a sum of respective required times of the pin and the box. The evaluation of the workability and the construction property was performed by obtaining a ratio to a reference value based on the processing time and the tightening time in the screw joint for the oil well pipe of test joint No. 6 illustrated in Table 1. In a case where the obtained ratio is less than 1.0, it was evaluated that the workability and the construction property were excellent, and in a case where the obtained ratio is 1.0 or more, it was evaluated that the workability and the construction property were inferior. Moreover, test joint No. 6 was designed not to use the screw length L (mm) defined in the disclosure but to use a general screw length of the related art.

The results obtained as described above are illustrated in Table 1.

As illustrated in Table 1, in the examples (test joint Nos. 1 to 3) of the disclosure, the screw length L (mm) in the screw rows satisfied the expression (2), so that it was found that the workability and the construction property were excellent. In addition, there was no shear fracture. On the other hand, in a comparative example (test joint No. 4) in which the screw length L exceeds an upper limit value of the expression (2), it was found that the processing time and the tightening time were increased, and the productivity was reduced. In a comparative example (test joint No. 5) in which the screw length L is lower than a minimum value of a lower limit value of the expression (2), it was found that the shear fracture occurred and the strength was insufficient.

That is, according to the disclosure, the screw joint for an oil well pipe having the appropriate screw length L in a range not causing the shear fracture is designed, so that it is possible to obtain the screw joint for an oil well pipe which has no problem of the shear fracture of the screw and in which the workability and the construction time are reduced (that is, excellent in productivity).

REFERENCE SIGNS LIST 1 screw joint for oil well pipe
2 pin
3 box
4 male screw portion
5 female screw portion
6 unprocessed portion of pin
7 unprocessed portion of box
9 seal portion on outer peripheral surface side
10 seal portion on inner peripheral surface side
11, 12 shoulder portion
13, 14 critical cross-section
15 nose
16 nose hole
17 screw row
α screw joint axis

TABLE 1

| Test joint No. | Box Pipe thickness of raw pipe portion: $t_b$ (mm) | Box Pipe diameter of raw pipe portion: $D_b$ (mm) | Pin Pipe thickness of raw pipe portion: $t_p$ (mm) | Pin Pipe diameter of raw pipe portion: $D_p$ (mm) | Ratio $\alpha_t$ of effective screw length to screw length L | Average screw diameter: $D_t$ (mm) | Joint efficiency (%) | Minimum value of screw length in screw row: $L_{min}$ (mm) |
|---|---|---|---|---|---|---|---|---|
| 1 | 13.84 | 244.48 | 13.84 | 244.48 | 0.6 | 230.64 | 70 | 27.97 |
| 2 | 13.84 | 244.48 | 13.84 | 244.48 | 0.6 | 230.64 | 70 | 27.97 |
| 3 | 13.84 | 244.48 | 13.84 | 244.48 | 0.4 | 230.64 | 70 | 41.95 |
| 4 | 13.84 | 244.48 | 13.84 | 244.48 | 0.6 | 230.64 | 70 | 27.97 |
| 5 | 13.84 | 244.48 | 13.84 | 244.48 | 0.6 | 230.64 | 70 | 27.97 |
| 6 | 13.84 | 244.48 | 13.84 | 244.48 | 0.6 | 230.64 | 70 | 27.97 |

| Test joint No. | Screw length in screw row: L (mm) | Screw length ratio $L/L_{min}$ | Shear fracture | Evaluation Workability Processing time (sec) | Ratio | Evaluation Construction property Tightening time (sec) | Ratio | Remarks |
|---|---|---|---|---|---|---|---|---|
| 1 | 30 | 1.1 | No | 150 | 0.75 | 192 | 0.91 | Example |
| 2 | 69 | 2.5 | No | 189 | 0.95 | 208 | 0.98 | Example |
| 3 | 60 | 1.4 | No | 180 | 0.90 | 204 | 0.96 | Example |
| 4 | 100 | 3.6 | No | 220 | 1.10 | 220 | 1.04 | Comparative example |
| 5 | 25 | 0.9 | Yes | 145 | 0.73 | 190 | 0.90 | Comparative example |
| 6 | 80 | 2.9 | No | 200 | — | 212 | — | Reference |

The invention claimed is:

1. A screw joint for an oil well pipe, comprising:
a pin that is provided with a male screw portion which is a male taper screw, at one end of a first steel pipe; and
a box that is provided with a female screw portion which is a female taper screw fitted to the male screw portion, at one end of a second steel pipe,
wherein the screw joint is an integral type screw joint,
a structure, in which the pin and the box are in metal contact with each other to seal a fluid, is provided at least at one place of a seal portion on an outer peripheral surface side of a pipe end side of the pin and a seal portion on an inner peripheral surface side of a pipe end side of the box,
wherein a minimum value $L_{min}$ (mm) of a screw length L (mm) in screw rows of the male taper screw and the female taper screw is defined by expression (1),
wherein the screw length L (mm) in the screw rows satisfies expression (2)

$$L_{min} = ((t \times (D-t))/(\alpha_t \times D_t / \sqrt{3})) \times \text{joint efficiency} \quad (1)$$

$$L_{min} \times 1.0 \leq L \leq L_{min} \times 2.5 \quad (2)$$

here, t: a pipe thickness (mm) of each of raw pipe portions which are unprocessed portions of the box and the pin,
D: a pipe diameter (mm) of each of the raw pipe portions which are unprocessed portions of the box and the pin,
$\alpha_t$: a ratio of an effective screw length to the screw length L, a shorter effective screw length of the box or the pin being chosen for the effective screw length,
$D_t$: an average screw diameter (mm) of screw valleys in the taper screw having a shorter effective screw length of the box or the pin, and
joint efficiency: tensile strength of the joint portion/tensile strength of the raw pipe portion, and
wherein the joint efficiency is less than 1.

* * * * *